Patented Mar. 12, 1946

2,396,477

UNITED STATES PATENT OFFICE 2,396,477

RACEMIC PANTOTHENIC ACID, DERIVATIVES THEREOF, AND PROCESSES OF PREPARING SAME

Eric Thomas Stiller, New York, N. Y., assignor to Merck & Co., Inc., Rahway, N. J., a corporation of New Jersey No Drawing. Application July 3, 1940, Serial No. 343,780

1 Claim. (Cl. 260—501)

This invention relates to racemic pantothenic acid, derivatives thereof, and processes of preparing the same.

I have discovered that racemic pantothenic acid may be obtained by reacting a $\beta$-alanine ester with racemic-$\alpha$-hydroxy-$\beta,\beta$-dimethyl-gamma-butyrolactone. Such lactone may be prepared by reacting isobutyraldehyde and formalin to give 2,2-dimethyl propanol-3,-al-1, which is treated with HCN to form the corresponding nitrile, which, upon hydrolysis, gives the said lactone.

The new compounds of the present invention have available growth promoting properties.

Example I.

Four grams of racemic $\alpha$-hydroxy-$\beta,\beta$-dimethyl-gamma-butyrolactone are mixed with 8 gms. of freshly distilled $\beta$-alanine ester, and heated for 3 hours on an oil bath, so that the contents of the flask remained at a constant temperature of 70° C. After cooling, the mixture is dissolved in 300 cc. of 0.45 N barium hydroxide solution and the solution allowed to stand for 3 hours. The barium is removed quantitatively with 6 N sulphuric acid, and the barium sulfate removed and washed twice with water. The aqueous solution and aqueous washings are adjusted to pH 5–6 with pyridine, and the water removed at 25–30° C. under reduced pressure. The almost colorless oil is dissolved in 8 cc. of alcohol, and 400–500 cc. of acetone are added slowly with stirring. The mixture is allowed to stand at 0° C. till the precipitated oil separates, and the clear supernatant liquid is decanted off. The insoluble material is twice retreated with alcohol and acetone in the same manner. The combined acetone-alcohol liquors are concentrated under reduced pressure at 25° C. to a thick oil, and dried in high vacuum. The viscous, almost colorless, oil is dissolved in 35 cc. of water and neutralized to pH 7.5 with barium hydroxide, and continuously extracted with ether for 18 hours to remove unchanged lactone.

The barium is removed quantitatively with 6 N sulphuric acid and the barium sulfate washed twice with water. The combined solution and washings are adjusted to pH 5–6 with pyridine and evaporated under reduced pressure at 25–30° C. The residue is thoroughly dried on a high vacuum pump at 40° C., and then extracted with 400–500 cc. reagent acetone. The clear supernatant liquor is taken to dryness under reduced pressure at 30°, and dried at 40° in high vacuum. Yield of racemic pantothenic acid is 5.69 gm.

Example II

To a solution of 0.84 gm. of racemic pantothenic acid in 10 cc. methyl alcohol, neutralized with sodium methylate, is added a solution of 0.84 gm. of benzylthiuronium chloride. The mixture is allowed to stand for an hour, evaporated to dryness, the residue extracted with hot acetone, and filtered from sodium chloride. The combined acetone extracts are concentrated until crystallization begins. The crystalline benzylthiuronium salt of racemic pantothenic acid (0.9 gm.) is recrystallized from acetone as colorless needles, M. P. 136–137° C.

Example III 0.1344 gm. of racemic pantothenic acid are dissolved in 2 cc. of absolute ethanol. The alcoholic solution is titrated with an aqueous solution of quinine methohydroxide until neutral to nitrazine yellow. The solution is concentrated in vacuo at 25° C., and the residue crystallized from alcohol-ether as rosettes of colourless needles.

Example IV

To a solution of 1.1612 gm. of racemic pantothenic acid in 25 cc. of absolute alcohol, are added 2.09 gm. of brucine. The mixture is refluxed 1 hour, and evaporated to dryness. The residue is taken up in 10 cc. of acetone, and on cooling, crystallizes in clumps. The brucine salt of racemic pantothenic acid has a M. P. 98–100° C. (with evolution of gas). $[\alpha]_D^{25} = -24.38°$. (C=1.9%; ethanol)

The strychnine, quinine and ephedrine salts can be prepared in a similar manner.

Example V

A solution of 5 gm. of racemic pantothenic acid in 25 cc. of water is neutralized with calcium carbonate. After removal of the excess calcium carbonate by filtration, the solution is evaporated to dryness at 25° C. in vacuo. The resulting hard, colorless mass on treatment with acetone gives a colorless micro-crystalline powder; yield 4.5 gm. The calcium salt of pantothenic acid is purified by dissolving in the minimum amount of methanol, and filtered from a trace of insoluble material. The methanol solution is then added slowly to a large volume of acetone with vigorous stirring. The colorless micro-crystalline powder is filtered off and dried at 78° in vacuum.

The barium, magnesium, zinc and silver salts can be prepared in a similar manner by employing the corresponding metal carbonate. They are obtained as colourless powders.

Example VI 3 gm. of racemic pantothenic acid are dissolved in a mixture of 10 cc. of pyridine and 10 cc. of acetic anhydride, and heated at 100° C. for 1½ hours. The mixture is evaporated to dryness in vacuo at 45° C., and thoroughly dried under high vacuum. Yield 3.1 gm. of viscous, yellowish diacetate of racemic pantothenic acid.

Example VII 6 gm. of racemic pantothenic acid in 20 cc. acetone are added to an excess of diazo methane in ethereal solution. After standing for 3 hours, the ether and excess diazo methane are removed by distillation. The residue is taken up in ether and extracted with a solution of sodium bicarbonate. The ethereal solution is dried over anhydrous sodium sulfate, and evaporated to dryness. The methyl ester may be purified by distillation at 60° and $10^{-4}$ mm. Yield of the methyl ester of racemic pantothenic acid is 5.3 gm.

The foregoing examples are given by way of illustration and not of limitation, and modifications may be made without departing from the spirit and scope of the invention.

I claim:

Ephedrine salt of racemic pantothenic acid.

ERIC T. STILLER.